Oct. 29, 1963  R. A. SOMMER  3,108,913
CRANKSHAFTS AND METHOD OF HARDENING SAME
Filed March 16, 1961
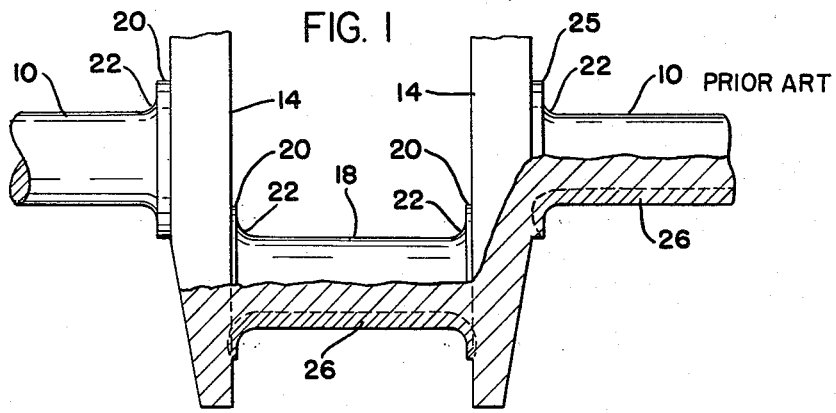
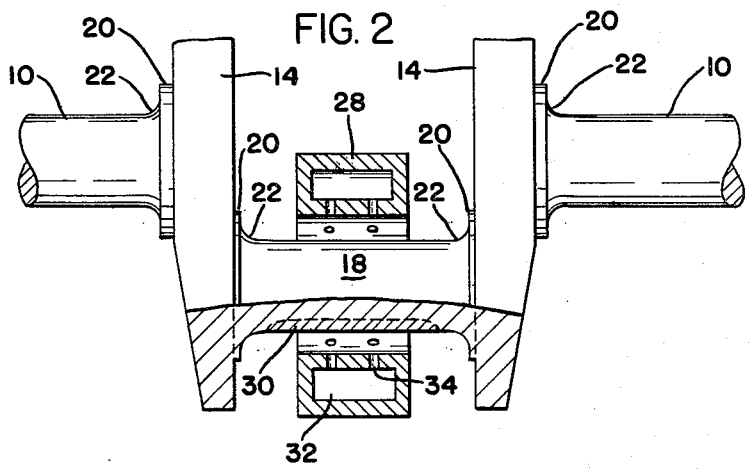
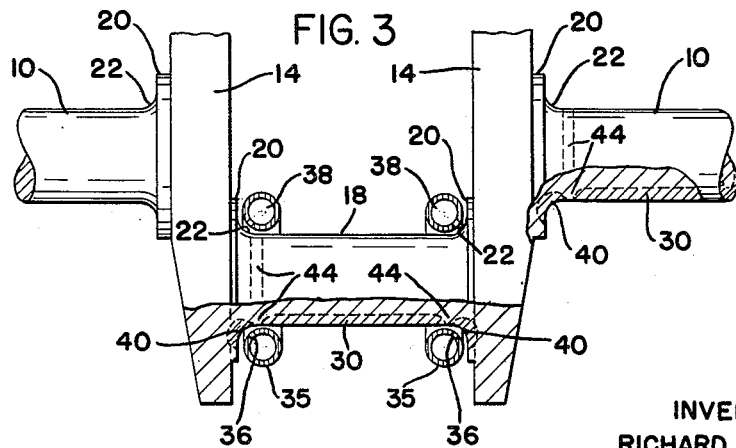
INVENTOR
RICHARD A. SOMMER
BY *Alfred C. Body*
ATTORNEY

3,108,913
CRANKSHAFTS AND METHOD OF HARDENING SAME
Richard A. Sommer, Cleveland, Ohio, assignor to The Ohio Crankshaft Company, Cleveland, Ohio, a corporation of Ohio
Filed Mar. 16, 1961, Ser. No. 96,268
10 Claims. (Cl. 148—39)

This invention relates to the art of crankshafts, and more particularly to a surface hardening pattern on a crankshaft and a method of producing such pattern.

As is known, crankshafts are comprised of a plurality of main and pin bearings in tandem relationship with adjacent bearings being radially offset one from the other and integrally joined by cheeks. The surfaces of these bearings blend into the surfaces of the cheeks through curved surfaces called fillets.

The bearing surfaces are subjected to very severe wear conditions and it has heretofore been conventional to harden the surfaces of the bearings by a process of very rapid induction heating and quenching. By such a surface hardening, it has been possible to practically eliminate wear of the bearing surfaces.

A crankshaft in service is also subjected to very high bending and twisting forces which produce large stresses throughout the crankshaft, but particularly in the area of the fillets. In order to increase the strength of the crankshaft, it has also been conventional to extends the surface hardening of the bearing surfaces into and around the fillets. By such an expedient, it has been possible to very substantially increase the ability of a crankshaft to resist the large forces exerted against it.

However, the surface hardening into the fillet has also created problems. In the first place, the surface hardening while increasing the strength of the fillet, also reduces its ductility such that if the fillet is stressed sufficiently high, the metal, instead of flowing to relieve the stresses, cracks with the result that these cracks then serve as stress concentration points in the crankshaft when it is subsequently subjected to working forces. These cracks will cause an early failure of the crankshaft even though the shaft is never again subjected to the force which produced the original crack.

The surface hardening of the entire bearing member and the fillets also produces problems in the manufacture of the crankshaft. Thus, the heating required to effect the surface hardening often releases residual stresses in the crankshaft such that after a heating and quenching operation, the crankshaft is distorted from its original configuration. It must be then subjected to a straightening operation.

In a straightening operation, the crankshaft is subjected to forces sufficient to bend it. Bending requires ductile metal. With the surface hardening extending clear across the bearings and into the fillets, there is often not enough ductility in the metal to permit straightening and hairline cracks develop with the result that the crankshaft must be rejected and scrapped.

Also after any bending has been performed on a crankshaft, the balance of stresses has been changed, leaving another balance of stresses which contain both tensile and compressive stresses. These tensile and compressive stresses are primarily located in and about the fillet area. A better crankshaft results if the stresses in the bearing surfaces and the fillet areas are all compressive; therefore, hardening the fillet area after any straightening operation changes the fillet area from a combination of tensile and compressive stresses to a fillet area having only a compressive stress. It is generally accepted that hardening a band of metal around a metallic cylindrical object will result in a compressive stress level within the object. Thus the crankshaft is improved by enabling it to withstand greater tensil and bending stresses.

In accordance with the present invention, a crankshaft of a heat hardenable metal is provided wherein both the fillets and the bearings are surface hardened as before, but the surface hardening is not continuous from the bearing surfaces to the fillet surfaces and there is a narrow circumferentially extending ring in the bearing surface adjacent to the fillets which is in an unhardened and therefore ductile condition. Stated otherwise, a crankshaft is provided made of a quench hardenable material with the bearing surface being quench hardened and the fillets being quench hardened with the quench hardened areas being axailly spaced one from the other.

Further in accordance with the invention, a method of manufacturing crankshafts is provided wherein the bearing surface is first quench hardened, followed by a quench hardening operation on the fillets, or vice versa, the two sequential hardening operations inherently leaving an annealed ring immediately adjacent to the last quench hardened portion.

Alternatively, in accordance with the invention, the bearings are first quench hardened to a limited axial extent and thereafter the fillets are hardened to leave an intermediate ring between the two quench hardened portions which has not been quench hardened.

Still further in accordance with the invention, the bearing is first induction-quench hardened using a relatively lower inducing frequency and thereafter the fillets are induction-quench hardened using a relatively higher inducing frequency.

The primary object of the invention is the provision of a new and improved crankshaft having portions thereof which are surface hardened on the bearing surfaces and fillet areas with the hardened areas and their inherent compressive stresses aiding the resistive stress level of the crankshaft.

Another object of the invention is the provision of a new and improved crankshaft which is able to withstand high momentary stresses without developing cracks in the fillets.

Another object of the invention is the provision of a new and improved crankshaft having both the bearing surfaces and the fillets surface hardened to increase the wear characteristics and strength respectively, but which has a band of ductile material extending to the surface of the bearings immediately adjacent to the fillets whereby the crankshaft retains its ductility.

Another object of the invention is a new and improved crankshaft which has both good wear characteristics, high strength, and ductility.

The above and other objects and features of the invention will become apparent from the following detailed description taken in connection with the accompanying drawings which form a part of this specification, and in which:

FIGURE 1 is a partially broken away side view of a section of a crankshaft illustrating the manner in which the cylindrical surfaces and adjacent fillets of the pins and bearings were hardened according to prior art techniques;

FIGURE 2 is a partially broken away side view of a crankshaft illustrating the manner in which the cylindrical surface of a pin or bearing is first hardened in accordance with the present invention without hardening the adjacent fillets; and FIGURE 3 is a partially broken away side view of a crankshaft section illustrating the manner in which the fillets at opposite ends of the cylindrical surfaces of bearings are hardened following a straightening operation to produce a completed hardened pattern.

Referring now to the drawings which are for the purpose of illustrating a preferred embodiment of the invention only and not for the purposes of limiting same, FIGURE 1 shows a section of a conventional crankshaft including a pair of main bearings 10 integrally connected by a pair of cheeks 14 with a pin bearing 18. The surfaces of the bearings 10 and 18 blend into the surfaces of the cheeks through conventional fillets 22 and shoulders 20 are provided at the end of the fillets 22 to provide clearance for the various grinding tools employed.

It will be appreciated that the crankshaft may have additional pin bearings, main bearings and cheeks as needed to fit the particular engine for which the crankshaft is designed. The specific design of the crankshaft forms no part of the present invention except insofar as it must have a bearing member, adjacent cheek members and the fillet joining the two members. Obviously, the curvature of the fillet may be as desired within normal design practice.

The material from which the crankshaft is manufactured also forms no part of the present invention except that it must be of a material having in the "as rolled," "as forged" or "as cast" state a degree of ductility such that it can be bent without developing cracks and the material must further have the characteristics of being able to be surface quench hardened, that is to say, when heated above a critical temperature and then rapidly cooled, the material will have a state of hardness substantially greater than that of the as rolled, as cast, as forged state, or as obtained in the tempered state. Steels of the S.A.E. 1040 type are generally satisfactory.

FIGURE 1 shows a typical hardness pattern 26 in a pin and main bearing as practiced in the prior art. It will be noted from FIGURE 1 that this hardness pattern extends at a uniform depth across the entire length of each bearing and then tapers off gradually around the fillet 22 and terminates radially outwardly from the fillet generally in the vicinity of the shoulder 20.

Such a hardness pattern was obtained by using a single high frequency inductor of an axial width and a contour to induce high frequency currents in the bearing and fillet surface of a sufficient magnitude to rapidly heat the metal in the pattern shown above the critical quench hardening temperature and thereafter quenching the metal. The hardness pattern can be readily identified by making a section of the crankshaft and polishing and etching the cross section in accordance with standard metallurgical procedures. The hardness pattern stands out very clearly with a different color than that of the unhardened metal.

As heretofore pointed out, such a hardness pattern, while giving great strength to the crankshaft in the fillets, makes it very difficult to straighten the crankshaft to remove distortion due to the heat treating. Thus such straightening operations exert forces sufficient to bend the crankshaft in the fillet area and inasmuch as the fillet area has had its ductility substantially reduced by the quench hardening instead of the fillet bending, hair line cracks develop which render the crankshaft unable to meet the rigid specifications of crankshaft users and it must therefore be scrapped. Furthermore, if a crankshaft having fillets without such hair line cracks is placed in service, and happens to be subjected to unusually high momentary stresses, the crankshaft cannot bend to relieve these momentary stresses, and again hair line cracks develop in the fillets which ultimately produce a failure of the crankshaft while in service in the engine with very serious damage, not only to the crankshaft, but to the other adjacent parts of the engine.

FIG. 3 shows the same crankshaft as FIG. 1 but with a hardness pattern in accordance with the present invention. In this embodiment of the invention, the fillets 22 have a hardness pattern 40 which is located only under the fillet while the bearing and axially separated from the fillet hardening pattern 40 by a narrow ring or band of unhardened material 44, it being noted from FIG. 3 that a complete hardness pattern on a bearing includes a pair of hardened areas 40, one under each fillet 22 and at least one hardened area 30 in the middle of the bearing 18 and axially separated from the two fillet hardened areas 40 by a pair of unhardened areas 44. Normally, these areas 44 will extend circumferentially around the bearing 18 in the form of a complete ring or band.

With this arrangement, the fillets receive the benefit of the strengthening effect of the hardened pattern 40. The bearing 18 receives the benefit of the increased wear characteristics of the hardened pattern 30. However, there extends to the surface of each bearing 18 ductile metal in the unhardened area 44 which can flow or bend under high mechanical forces without the development of hair line cracks, as was the case when the hardness pattern was continuous across the bearing 18 and into the fillets 22.

The hardness pattern in accordance with the present invention, can be produced a number of different ways. In accordance with the preferred embodiment, a high frequency induction heating coil 28 of known construction and of an axial length less than the axial length of the bearing 18 is placed around the bearing and equally spaced from the cheeks 14. This coil 28 is either made in two pieces or is hinged so that it can be placed around the bearing member 18 and subsequently removed. The coil 28 is then energized from a suitable source of high frequency electric current such that very high density electric currents are induced to flow in the surface of the bearing 18 and heat this surface so rapidly that only the surface is heated above the critical quench hardening temperature. Immediately after the surface to the desired depth has been heated to this temperature, the electric power is turned off and quench water is flowed through the internal passages 32 of the inductor 28 and outwardly through the opening 34 onto the surface to rapidly quench it in a manner known in the art to effect the hardness pattern 30 shown in FIG. 2.

Normally it is desired that the radial depth of a pattern 30 be substantial and therefore a relatively low inducing current on the order of 3,000 to 10,000 cycles per second is employed.

If desired, the crankshaft may then be processed in the normal way including the final grinding of the bearing 18 to or almost to its final diameter.

Also the crankshaft can be straightened, inasmuch as the fillets remain in unhardened condition, they are sufficiently ductile to permit the crankshaft to be straightened.

Thereafter the fillets are quench hardened. These fillets may be hardened either one at a time or a pair of fillets may be hardened simultaneously. In the embodiment of the invention shown in FIG. 3, a pair of inductors 35 are positioned in close proximity to each fillet 22. These inductors are generally formed of conductors having a circular cross section so that they may be moved into close proximity with the fillets 22 and their outer curvature conform generally to the curvature of the fillets 22. These inductors are preferably energized from a source of high frequency current of a frequency higher than that employed for the hardening of the main bearings, e.g., 450,000 cycles per second. This frequency is employed so as to produce a shallow or hardness pattern and also because of the higher frequency, it is possible to get hardening into the fillet which is difficult if a lower frequency were employed.

The inductor has a passage 38 through which quench water is supplied and is projected onto the heated fillet through a passage 36.

It is to be noted that the hardness pattern produced by the inductor 34 is axially spaced from the hardness pattern 30 by the narrow band 44.

It is to be noted, however, that if the hardness pattern 30 should tend to extend across the area where the band 44 is located, that the hardening operation on the fillets will anneal any previously quench hardened material immediately adjacent to the hardened pattern on the fillet. Thus, in all instances, the use of the two sequential hardening operations will inherently result in a band of unhardened material separating the two hardened patterns.

Thus, by the use of the words "as cast," "as forged" or "as rolled" is not meant to exclude material which has been quench hardened and is subsequently reduced to a lower hardened state by a tempering operation.

It is to be noted, however, that the heating and quenching in the filleted area is so shallow and so rapid that a minimum of distortion results in the crankshaft because of the hardening in the fillet.

The invention has been described with reference to preferred embodiments. Obviously, modifications and alterations will occur to others upon a reading and understanding of this specification, and it is my intention to include all such modifications and alterations insofar as they come within the scope of the appended claims.

Having thus described my invention, I claim:

1. In the method for hardening a shaft having a generally cylindrical outer surface and annular fillets at the opposite ends of the cylindrical surface, the steps of inductively hardening the cylindrical surface without hardening the adjacent fillets, and thereafter hardening the fillets to provide hardened areas which are spaced from the hardened area of the cylindrical surface to leave narrow unhardened bands between the hardened fillets and the previously hardened cylindrical surface.

2. In the method for hardening a shaft having a generally cylindrical outer surface and annular fillets at the opposite ends of the cylindrical surface, the steps of inductively heating the cylindrical surface without heating the adjacent fillets, quenching said inductively heated cylindrical surface, thereafter inductively heating the fillets at the opposite ends of said cylindrical surface to provide heated areas which are spaced from the previously heated area of the cylindrical surface, and quenching said inductively heated fillets to produce hardened fillets separated from the hardened cylindrical surface by narrow unhardened bands.

3. In the method for hardening a shaft having a generally cylindrical outer surface and annular fillets at the opposite ends of the cylindrical surface, the steps of inductively heating the cylindrical surface at a predetermined induction frequency without heating the adjacent fillets, quenching said inductively heated cylindrical surface, thereafter inductively heating the fillets at a frequency higher than said predetermined frequency to provide inductively heated areas which are spaced from the previously heated area of the cylindrical surface, and quenching said inductively heated fillets to produce hardened fillets separated from the hardened cylindrical surface by narrow unhardened bands.

4. In the method for hardening a crankshaft having a plurality of cylindrical surfaces thereon with annular fillets at the opposite ends of each of the surfaces, the steps of inductively hardening the cylindrical surfaces without hardening the adjacent fillets, and thereafter inductively hardening the fillets to provide hardened areas which are spaced from the hardened areas of the cylindrical surfaces to leave narrow unhardened bands between the hardened fillets and the previously hardened cylindrical surfaces.

5. In the method for hardening a crankshaft having a plurality of cylindrical surfaces thereon with annular fillets at the opposite ends of each of the cylindrical surfaces, the steps of inductively hardening the cylindrical surfaces without hardening the adjacent fillets, straightening and grinding the crankshaft, and thereafter inductively hardening the fillets at the ends of each cylindrical surface to provide hardened areas which are spaced from the hardened areas of the cylindrical surfaces to leave narrow unhardened bands between the hardened fillets and the previously hardened cylindrical surfaces.

6. In the method for hardening a crankshaft having a plurality of cylindrical surfaces thereon with annular fillets at the opposite ends of each of the cylindrical surfaces, the steps of inductively heating the cylindrical surfaces without heating the adjacent fillets, quenching the heated cylindrical surfaces, straightening and grinding the crankshaft, thereafter inductively heating the fillets at the ends of each cylindrical surface to provide heated areas which are spaced from the previously heated areas of the cylindrical surfaces, and quenching the heated fillets to provide hardened areas which are spaced from the previously hardened areas of the cylindrical surfaces to leave narrow unhardened bands between the hardened fillets and the hardened cylindrical surfaces.

7. In the method for hardening a crankshaft having a plurality of cylindrical surfaces thereon with annular fillets at the opposite ends of each of the cylindrical surfaces, the steps of inductively heating the cylindrical surfaces at a predetermined induction frequency without heating the adjacent fillets, quenching the heated cylindrical surfaces to harden the same, thereafter inductively heating the fillets at the ends of each cylindrical surface at a frequency higher than said predetermined frequency to provide heated areas which are spaced from the previously heated areas of the cylindrical surfaces, and quenching the heated fillets to produce hardened areas which are spaced from the hardened areas of the cylindrical surfaces to leave narrow unhardened bands between the hardened fillets and the hardened cylindrical surfaces.

8. A crankshaft comprised of a cylindrical bearing surface and a fillet at least on one end of said surface joining said surface with a cheek, said fillet and said bearing each having a quench hardened surface, said two surfaces being spaced by an unhardened portion having a ductility corresponding to that of the core of the bearing.

9. A crankshaft comprised of a cylindrical bearing and integral cheeks at each end of said bearing extending transversely to the axis thereof, the surface of said bearing being joined with the surface of said cheek by a fillet, said bearing and cheeks being characterized by a hardness pattern in cross section which extends along the length of and to a short depth below said bearing surface and a hardness pattern which extends around and to a depth below said fillet surfaces, said hardness patterns being axially spaced and separated by the material of said crankshaft in the normalized, quenched and tempered state.

10. In a crankshaft comprised of a plurality of cylindrical bearings integrally joined by cheeks extending transversely to the axial length of said bearings, the bearing surface being joined with the cheek surface through a filleted surface, said bearing surface and said fillet surface each having to a depth below the surface thereof a hardness characteristic of quench hardening, the improvement in combination therewith which comprises: said bearing surface hardness and said fillet surface hardness being axially separated by a portion of material in the unhardened state.

References Cited in the file of this patent

UNITED STATES PATENTS 2,292,209  Deneen et al. _____ Aug. 4, 1942

OTHER REFERENCES

Induction Heating, copyright 1946 by the A.S.M., Cleveland, Ohio, pp. 92 and 93.